US012762053B2

(12) United States Patent
Wang et al.

(10) Patent No.: US 12,762,053 B2
(45) Date of Patent: *Oct. 13, 2026

(54) TECHNIQUES FOR ACCESSING MANAGED NAND

(71) Applicant: Micron Technology, Inc., Boise, ID (US)

(72) Inventors: Junjun Wang, Shanghai (CN); Yi Heng Sun, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/896,407

(22) Filed: Sep. 25, 2024

(65) Prior Publication Data

US 2025/0094341 A1 Mar. 20, 2025

Related U.S. Application Data

(63) Continuation of application No. 17/262,476, filed as application No. PCT/CN2020/134306 on Dec. 7, 2020, now Pat. No. 12,124,367.

(51) Int. Cl.
*G06F 12/02* (2006.01)
*G06F 12/06* (2006.01)

(52) U.S. Cl.
CPC ...... *G06F 12/0253* (2013.01); *G06F 12/0238* (2013.01); *G06F 12/0653* (2013.01); *G06F 2212/7209* (2013.01)

(58) Field of Classification Search
None
See application file for complete search history.

(56) References Cited

U.S. PATENT DOCUMENTS 7,296,139 B1 11/2007 Case et al.
11,216,381 B2 * 1/2022 Ke ...................... G06F 12/0882
(Continued)

FOREIGN PATENT DOCUMENTS

CN 106547703 A 3/2017
CN 107092563 A 8/2017
(Continued)

OTHER PUBLICATIONS

"International Search Report and Written Opinion of the International Searching Authority," issued in connection with Int'l Appl. No. PCT/CN2020/134306, dated Sep. 7, 2021 (6 pages).
(Continued)

*Primary Examiner* — Charles J Choi
(74) *Attorney, Agent, or Firm* — Holland & Hart LLP

(57) ABSTRACT

Methods, systems, and devices for techniques for accessing managed not-AND (NAND) memory are described. An indicator of a first type that indicates whether each physical address in a group of physical addresses stores valid data may be accessed. Indicators of a second type may be used to indicate whether respective physical addresses of the group of physical addresses store valid data. Data stored at the group of physical addresses may be transferred to a different group of physical addresses based on the indicator of the first type. Also, another indicator of the first type that indicates whether each physical address in the different group of physical addresses stores valid data may be updated.

20 Claims, 5 Drawing Sheets

(56) References Cited

U.S. PATENT DOCUMENTS

| | | | |
|---|---|---|---|
| 11,687,447 | B1 | 6/2023 | Yang |
| 2013/0275660 | A1 | 10/2013 | Bennett |
| 2016/0026408 | A1 | 1/2016 | Peterson |
| 2017/0300249 | A1 | 10/2017 | Geml et al. |
| 2019/0004700 | A1 | 1/2019 | Oshinsky et al. |
| 2020/0142821 | A1 | 5/2020 | Cui et al. |
| 2022/0156183 | A1 | 5/2022 | Li |
| 2022/0405199 | A1 | 12/2022 | Kanno |
| 2022/0414003 | A1 | 12/2022 | Duan et al. |

FOREIGN PATENT DOCUMENTS

| | | | |
|---|---|---|---|
| CN | 109086219 | A | 12/2018 |
| CN | 111902806 | A | 11/2020 |

OTHER PUBLICATIONS

Engish translation of CN 109086219A (Year: 2018).

* cited by examiner

TECHNIQUES FOR ACCESSING MANAGED NAND

CROSS REFERENCE

The present Application for Patent is a continuation of U.S. patent application Ser. No. 17/262,476 by Wang et al., entitled "TECHNIQUES FOR ACCESSING MANAGED NAND," filed Jan. 22, 2021, which is a 371 national phase filing of International Application No. PCT/CN2020/134306, by Wang et al., entitled "TECHNIQUES FOR ACCESSING MANAGED NAND," filed Dec. 7, 2020, each of which is assigned to the assignee hereof, and each of which is expressly incorporated by reference in its entirety herein.

FIELD OF TECHNOLOGY

The following relates generally to one or more systems for memory and more specifically to techniques for accessing managed NAND.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
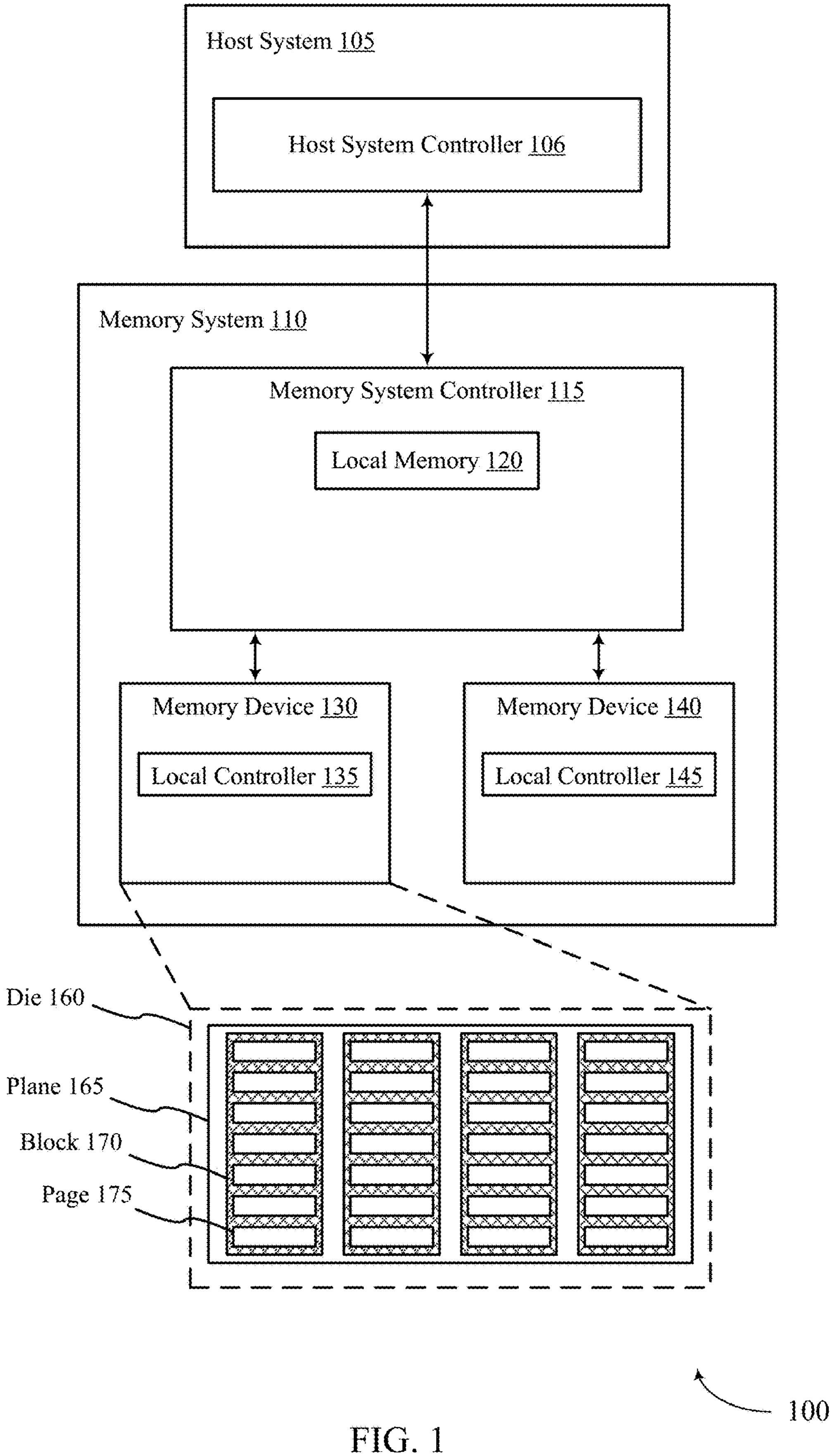
FIG. 1 illustrates an example of a system that supports techniques for accessing managed NAND in accordance with examples as disclosed herein.

A not-and (NAND) memory device may maintain a logical address table that stores logical addresses used by a host system. The memory device may also maintain a mapping between the logical addresses in the logical address table and physical addresses of a memory array included in the memory device. A physical address of a memory array may be used to refer to a set of memory cells (e.g., a set of memory cells included in one or more pages of memory, a set of memory cells included in a subpage of memory, etc.). Changes by a host system to data stored at a logical address may cause data stored at the corresponding physical address to become invalid—e.g., due to architectural and operational aspects of NAND memory devices. In some examples, the memory device may use a validity table to keep track of whether physical addresses of a memory array are being used to store valid data or invalid data. The memory device may update the validity table throughout the operation of the memory device as associations between logical and physical addresses change.

The memory device may use the validity table during a memory management operation (e.g., a garbage collection operation) to identify sets of memory cells that are storing valid data—e.g., based on identifying sets of memory cells that correspond to physical addresses identified as valid by the validity table. During a garbage collection operation, the memory device may use the validity table to move valid data stored at physical addresses in a first block of memory to physical addresses in a different block of memory. After moving the valid data, the memory device may erase the block of memory including invalid data stored at other physical addresses in the first block of memory. In some examples, before moving the valid data to the other block of memory, the memory device may process the validity table to identify groups of physical addresses associated with valid data. But performing an operation for identifying groups of physical addresses that store valid data using a validity table that indicates data validity at a first granularity (e.g., per page, per subpage, etc.) to facilitate garbage collection may introduce latency into a garbage collection operation.

To reduce latency associated with a memory management operation (e.g., a garbage collection operation), an additional validity table that indicates data validity at a coarser granularity than the existing validity table may be maintained—e.g., the additional validity table may indicate data validity on a multiple page basis and the existing validity table may indicate data validity on a single page basis. The existing validity table may be referred to as a low-level validity table and the additional validity table may be referred to as a high-level validity table. In some examples, as part of a memory management operation (e.g., during an unmap operation, a rewrite operation, a garbage collection operation, etc.), a memory system accesses the high-level validity table to determine whether a group of physical addresses (e.g., one or more pages) in a first block is storing valid data for sequential logical addresses—e.g., by determining a value of a bit that is associated with the group of physical addresses. Sequential logical addresses may be associated with logical addresses that are adjacent to one another—e.g., logical address "0" and logical address "1" may be sequential.

If the bit indicates that the group of physical addresses is storing valid data for sequential logical addresses, the memory system may transfer the data stored at the group of physical addresses to a different group of physical addresses in another block. The memory system may also update the high-level validity table by setting a bit that is associated with the different group of physical addresses to indicate that the different group of physical addresses is storing valid data for the sequential logical addresses. In some examples, the memory system transfers this data without accessing the lower-level table which may indicate for each physical address in the group of physical addresses whether respective physical addresses store valid data.

Alternatively, if the bit indicates that the group of physical addresses is storing invalid data or valid data for non-sequential logical addresses, the memory system may access the low-level validity table to determine, on an individual basis, whether the physical addresses (e.g., a page) of the group of physical addresses are storing valid data. The memory system may then transfer the data stored at the physical addresses identified as storing valid data to a different group of physical addresses in another block. The memory system may also update the high-level validity table by setting a bit that is associated with the different group of physical addresses to indicate that the different group of physical addresses is storing invalid data. And the memory system may update the low-level validity table by setting the bits associated with the recently programmed physical addresses to indicate that the programmed physical addresses are storing valid data.

By accessing the high-level validity table before the low-level validity table, a memory management operation may unmap and/or move data without checking validity information for each physical address in a block, reducing latency associated with some aspects of the memory management operation.

Features of the disclosure are initially described in the context of a system that includes a host system and memory system. Features of the disclosure are also described in the context of a physical memory map and flowchart. These and other features of the disclosure are further illustrated by and described with reference to an apparatus diagram and a flowchart that relate to techniques for accessing managed NAND.

FIG. 1 is an example of a system 100 that supports techniques for accessing managed NAND in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). In some examples, a NAND memory cell (or group of NAND memory cells) may be more easily (e.g., with less operations, etc.) programmed to one logic value (e.g., a logic value 0) than another logic value (e.g., logic value 1). That is, to write the other logic value to a NAND memory cell (or group of NAND memory cells), a memory system 110 may first erase a block 170 that includes the NAND memory cell (or group of NAND memory cells) and then set each NAND memory cell in the block 170 to the logic value. Thus, in some examples, writing a first logic value (e.g., a logic value 0) to a NAND memory cell (or group of NAND memory cells) may be faster than writing a second logic value (e.g., a logic value 1) to a NAND memory cell (or group of NAND memory cells).

Accordingly, in some cases, to update some data within a block 170 while retaining other data within the block 170, the memory device 130 may copy the data to be retained to a new block 170 and write the updated data to one or more remaining pages of the new block 170—e.g., where each of the one or more remaining pages may include one or more memory cell sets that each store a logic value 1). The memory device 130 (e.g., the local controller 135) or the memory system controller 115 may mark or otherwise designate the data that remains in the old block 170 as invalid or obsolete, and update a logical-to-physical (L2P) mapping table to associate the logical address (e.g., LBA) of the data with the new, valid block 170 rather than the old, invalid block 170. In some cases, such copying and remapping may be preferable to erasing and rewriting the entire old block 170, due to latency or wearout considerations, for example. In some cases, one or more copies of an L2P mapping table may be stored within the memory cells of the memory device 130 (e.g., within or more blocks 170 or planes 165) for use (e.g., reference and updating) by the local controller 135 or memory system controller 115.

In some cases, L2P tables and/or validity tables may be maintained and data may be marked as valid or invalid at the page level of granularity, and a page 175 may contain valid data, invalid data, or no data. In some examples, data may be marked as valid or invalid at a subpage level of granularity—e.g., the data stored in sets of memory cells included in a page (or subpages) may be marked as valid or invalid. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased. In some cases, a validity table may be maintained and used to keep track of whether a physical address is storing valid data or invalid data or is free to store data. A physical address may be used to refer to a set of memory cells (e.g., a set of memory cells included in one or more pages 175, as set of memory cells included in a subpage, and the like) When data is marked as valid or invalid at the page level, the validity table may include an indicator for a set of memory cells included in a page. When data is marked as valid or invalid at the subpage level, the validity table may include an indicator for a set of memory cells included in a subpage.

The validity table may be maintained based on a behavior of a host system 105. For example, if the host system 105 issues a command to write data to one or more logical addresses (which may also be referred to as logical block addresses), the memory system 110 may write the data to memory cells at one or more physical addresses. The memory system 110 may also update the validity table to indicate, for the one or more physical addresses) that the data stored at the physical addresses is valid. In some examples, the host system 105 performs a sequential write operation that involves writing data to a sequential set of logical addresses. In such cases, the memory system 110 may similarly write the data to a sequential set of physical addresses. In another example, the host system 105 may issue a command that changes or invalidates the data stored at one or more logical addresses. For example, the host system 105 may issue a command to erase the data stored at the one or more logical addresses, or the host system 105 may issue a command to modify the data stored at the one or more logical addresses. If the host system 105 issues a command to erase the data, the memory system 110 may perform an unmap operation for the data that involves marking the one or more physical addresses corresponding to the one or more logical addresses as storing invalid data and freeing the one or more logical addresses to store data. If the host system 105 issues a command to modify the data, the memory system 110 may perform a rewrite operation for the data that involves writing the modified data to a different set of one or more physical addresses, updating the L2P table to associate the one or more logical addresses with the different set of physical addresses, and marking the original one or more physical addresses as storing invalid data.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some examples, the validity table assists the garbage collection operation by indicating physical addresses (e.g., sets of memory cells) that contain valid data and physical addresses that contain invalid data. That is, the garbage collection operation may use the validity table to determine which data (i.e., the valid data) should be copied from the old block 170 the new block 170 on a level that is consistent with the level of granularity used to indicate the validity of the data before erasing the data stored by the old block 170. For example, if the validity table indicates validity on a per page level, then the garbage collection operation may copy data stored in a set of memory cells included in a page 175 from the old block 170 to a set of memory cells included in a page in the new block 170 if the validity table indicates that the physical address of the page 175 is storing valid data. To increase the efficiency of the garbage collection operation, the garbage collection algorithm may use the validity table to identify groups of physical addresses (which may correspond to contiguous sets of memory cells) that store valid data to enable larger data sets to be copied between the old block 170 and the new block 170 and to reduce a quantity of copying operations. But performing an operation for identifying groups of physical addresses that store valid data using a validity table that indicates data validity at a first granularity (e.g., per page, per subpage, etc.) to facilitate garbage collection may introduce latency into a garbage collection operation.

To reduce latency associated with a memory management operation (e.g., a garbage collection operation), an additional validity table that indicates data validity at a coarser granularity than the existing validity table may be maintained—e.g., the additional validity table may indicate data validity on a multiple page basis and the existing validity table may indicate data validity on a single page basis. The existing validity table may be referred to as a low-level validity table and the additional validity table may be referred to as a high-level validity table. In some examples, as part of a memory management operation (e.g., during an unmap operation, a rewrite operation, a garbage collection operation, etc.), a memory system accesses the high-level validity table to determine whether a group of physical addresses (e.g., one or more pages) in a first block is storing valid data for a sequential set of logical addresses—e.g., by determining a value of a bit that is associated with the group of physical addresses. If the bit indicates that the group of physical addresses is storing valid data for sequential logical addresses, the memory system may transfer the data stored at the group of physical addresses to a different group of physical addresses in another block. The memory system may also update the high-level validity table by setting a bit that is associated with the different group of physical addresses to indicate that the different group of physical addresses is storing valid data for the sequential logical addresses. In some examples, the memory system transfers this data without accessing the lower-level table which may indicate for each physical address in the group of physical addresses whether respective physical addresses store valid data.

Alternatively, if the bit indicates that the group of physical addresses is storing invalid data or valid data for non-sequential logical addresses, the memory system may access the low-level validity table to determine, on an individual basis, whether the physical addresses of the group of physical addresses are storing valid data. The memory system may then transfer the data stored at the physical addresses identified as storing valid data to a different group of physical addresses in another block. The memory system may also update the high-level validity table by setting a bit that is associated with the different group of physical addresses to indicate that the different group of physical addresses is storing invalid data. And the memory system may update the low-level validity table by setting the bits associated with the recently programmed physical addresses to indicate that the programmed physical addresses are storing valid data. By accessing the high-level validity table before the low-level validity table, a memory management operation may unmap and/or move data without checking validity information for each physical address in a block, reducing latency associated with the memory management operation.

The system 100 may include any quantity of non-transitory computer readable media that support techniques for accessing managed NAND. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform one or more associated functions as described herein.

Figure 2:
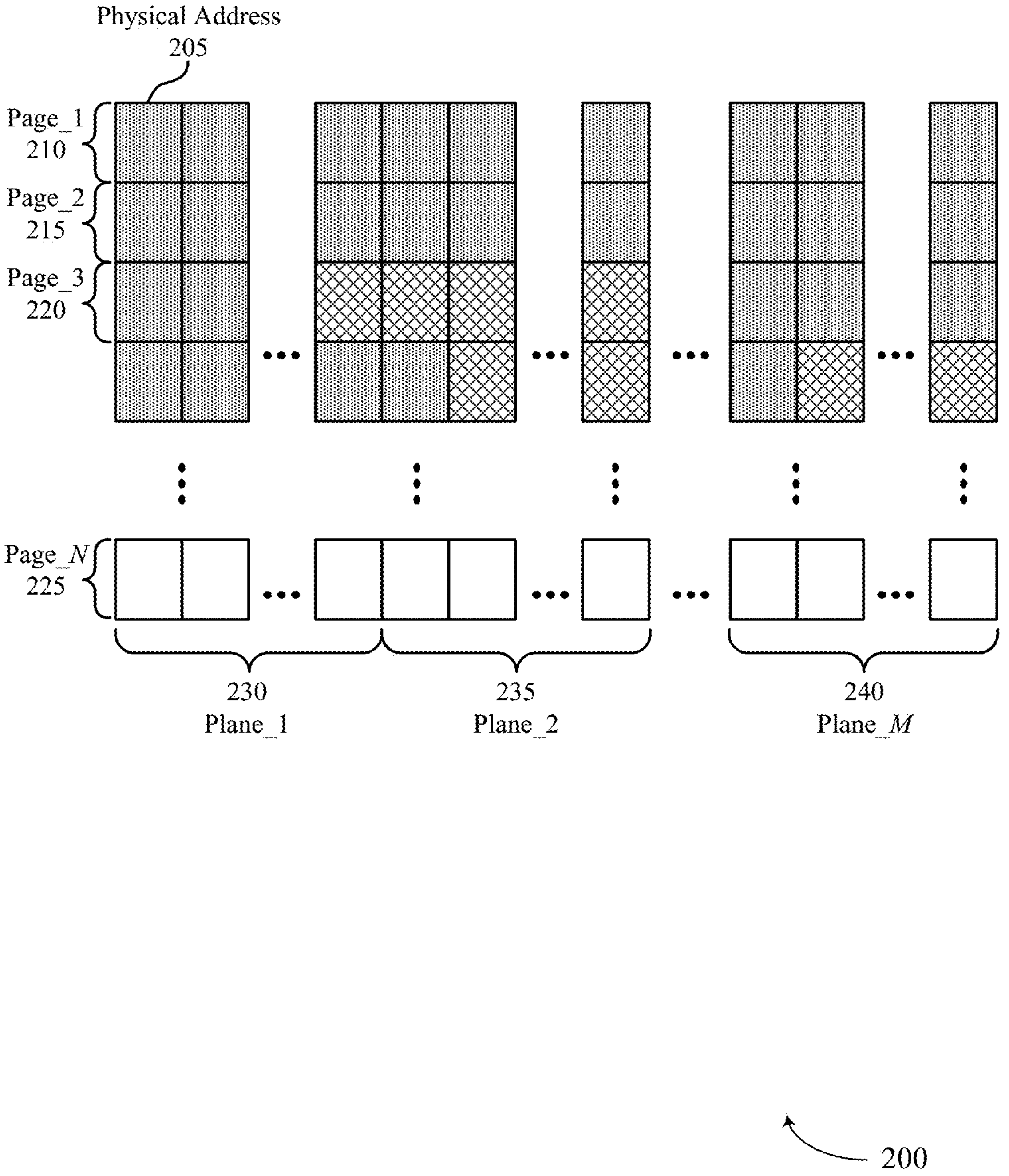
FIG. 2 illustrates an example of a physical memory map that supports techniques for accessing managed NAND in accordance with examples as disclosed herein.

FIG. 2 illustrates an example of a physical memory map that supports techniques for accessing managed NAND in accordance with examples as disclosed herein.

Physical memory map 200 may represent a physical area of memory that is partitioned (e.g., logically and/or physically) into multiple pages and multiple planes. The pages and planes may be examples of the pages and planes described in FIG. 1. A page of physical memory map 200 may be further partitioned (e.g., logically and/or physically) into multiple sections, where each section may be representative of multiple memory cells, and each plane may include one or more sections. In some examples, the sections may be representative of a smallest set of memory cells that may be programmed or read at one time. In some examples, a physical address and, in some examples, a logical address may be associated with one of the sections.

Physical memory map 200 may include first page 210, second page 215, third page 220, and nth page 225. First page 210 may include multiple memory cells, which may be partitioned (e.g., logically and/or physically) into memory cell sets. In some examples, physical address 205 is used to refer to a first memory cell set included in first page 210. In some examples, each of the memory cell sets in first page 210 may store valid data. Similarly, each of the memory cell sets in second page 215 may store valid data. Third page 220 may also include multiple memory cell sets. However, one or more of the memory cell sets included in third page 220 may store invalid data. In some examples, nth page 225 may include memory cell sets that store neither valid nor invalid data. That is, the memory cell sets in nth page 225 may be characterized as free—e.g., and available to be programmed. In some examples, each of the memory cell sets in nth page 225 store a first logic value (e.g., a logic value 1). In some examples, a page may support storage of 512 data bytes and 16 spare bytes. In other examples, a page may support storage of 2,048 data bytes and 64 spare bytes.

Physical memory map 200 may also include first plane 230, second plane 235, and mth plane 240. As described herein, in some examples, a controller may access memory cells in one plane while simultaneously accessing memory cells in another plane. In some examples, when memory cells are erased in one plane, the controller may also be configured to erase memory cells in related planes—e.g., the controller may be configured to erase the memory cells in first plane 230 together with the memory cell in second plane 235 through mth plane 240.

In some examples, multiple validity tables may be used to keep track of a validity of data stored at the physical addresses included in physical memory map 200. A first, low-level validity table may be used to indicate, for each physical address, whether the physical address stores valid data. Thus, the first validity table may include N×M entries, where a first bit of the first validity table may indicate whether physical address 205 is storing valid or invalid data. In some examples, if a bit of the first validity table represents a logic value 1, then the corresponding physical address stores valid data, or if the bit represents a logic value 0, then the corresponding physical address stores invalid data. An example representation of the first validity table for physical memory map 200 is shown below in Table 1, where the first row corresponds to first page 210, the second row corresponds to second page 215, and so on until the nth and the nth page 225. Similarly, the first four columns correspond to first plane 230, the second four columns correspond to second plane 235, and so on until the last four columns, which correspond to mth plane 240.

TABLE 1

| | | | | | | | | | | | | |
|---|---|---|---|---|---|---|---|---|---|---|---|---|
| 1 | 1 | . . . | 1 | 1 | 1 | . . . | 1 | . . . | 1 | 1 | . . . | 1 |
| 1 | 1 | . . . | 1 | 1 | 1 | . . . | 1 | . . . | 1 | 1 | . . . | 1 |
| 1 | 1 | . . . | 0 | 0 | 0 | . . . | 0 | . . . | 1 | 1 | . . . | 1 |
| 1 | 1 | . . . | 1 | 1 | 0 | . . . | 0 | . . . | 1 | 0 | . . . | 0 |
| . . . | . . . | . . . | . . . | . . . | . . . | . . . | . . . | . . . | . . . | . . . | . . . | . . . |
| X | X | . . . | X | X | X | . . . | X | . . . | X | X | . . . | X |

Also, a second, high-level validity table may be used to indicate, for a group of physical addresses, whether the group of physical addresses stores valid data for sequential logical addresses. An example representation of the second validity table for physical memory map 200 is shown below in Table 2, where the first column corresponds to first page 210 and second page 215 (or the first two rows of Table 1), the second column correspond to third page 220 and a fourth page (or the second two rows of Table 1), and so on until the last column which corresponds to the (n−1)th page and the nth page 225. In some examples, an entry in the high-level validity table may be a zero when all of the physical addresses in a group of physical addresses store valid data for a non-sequential set of logical addresses. Other configurations may also be used. For example, the entries of Table 2 may correspond to a single page, additional pages, or to one or more subpages. In some examples, the high-level validity table may be used to indicate, for a group of physical addresses, whether the group of physical addresses stores valid data regardless of whether the corresponding logical addresses are sequential.

TABLE 2

| | | | |
|---|---|---|---|
| 1 | 0 | . . . | X |

A memory device may maintain the validity tables during operation of the memory device—e.g., when programming, erase, unmapping, rewriting, and/or garbage collection operations are performed. The memory device may also use the validity tables to facilitate the execution of garbage collection operations, which may reduce a latency of garbage collection operations. Operations for maintaining and/or using the validity tables are discussed in more detail herein and with reference to FIG. 3.

Figure 3:
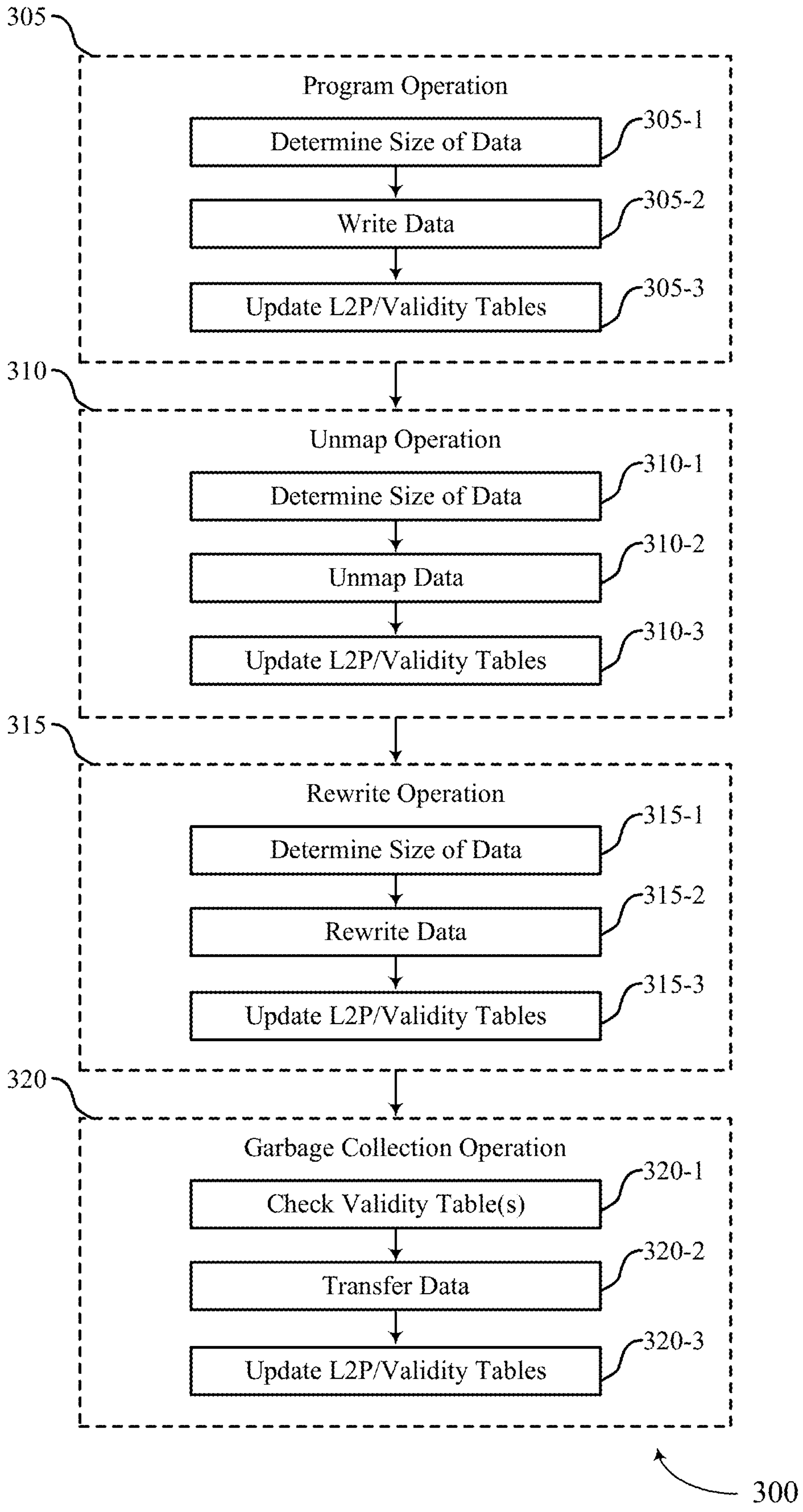
FIG. 3 illustrates an example of a flowchart that supports techniques for accessing managed NAND in accordance with examples as disclosed herein.

FIG. 3 illustrates an example of a flowchart that supports techniques for accessing managed NAND in accordance with examples as disclosed herein.

Flowchart 300 may be performed by a memory system or memory device as described in FIG. 1. In some examples, flowchart 300 illustrates an exemplary sequence of operations performed to support accessing managed NAND using multiple validity tables. For example, flowchart 300 depicts operations for accessing a managed NAND and further describes how the multiple validity tables are managed and used when the operations are performed.

It is understood that one or more of the operations described in flowchart 300 may be performed earlier or later in the process, omitted, replaced, supplemented, or performed in combination with another operation. Also, additional operations described herein that are not included in flowchart 300 may be included.

Aspects of the flowchart 300 may be implemented by a controller, among other components. Additionally, or alternatively, aspects of the flowchart 300 may be implemented as instructions stored in memory (e.g., firmware stored in a memory coupled with a controller). The instructions, when executed by a controller, may cause the controller to perform the operations of the flowchart 300.

At block 305, an operation to store data for a host system may be performed. For example, a memory device may perform a program operation to store data for a host system.

As part of a program operation, the memory device may store data received from a host system at a set of physical addresses. The memory device may also associate the physical addresses with a set of logical addresses targeted by the host system (e.g., based on an L2P table).

In some examples, the program operation is used to store a large amount of data (e.g., greater than 128 Kilobytes of data). In some examples, a large program operation may refer to a program operation that writes an amount of data to a memory array that exceeds an amount of data that can be stored by a group of physical addresses (e.g., by two or more pages). In other examples, the program operation is used to store a small amount of data (e.g., less than 128 Kilobytes of data). In some examples, a small program operation may refer to a program operation that writes an amount of data to a memory array that is less than an amount of data that can be stored by a group of physical addresses.

At block 305-1, a size of the data to be written to the memory may be determined. For example, the memory device may determine a size of the data to be written to a memory array. In some examples, the memory device may determine that the size of the data exceeds a threshold. In other examples, the memory device may determine that the size of the data is below a threshold.

At block 305-2, one or more commands to store an amount of data having a size that exceeds the threshold may be received from a host system. For example, the memory device may receive one or more commands from a host system to store an amount of data having a size that exceeds the threshold. Alternatively, the memory device may receive one or more commands from a host system to store an amount of data having a size that is below the threshold. In both cases, the memory device may write the data to a quantity of physical addresses that support storing the received data (e.g., that are free to store data). In some examples, the host system may request that data be stored in consecutive logical addresses (that is, the host system may perform a sequential write), and the memory device may write the data to consecutive physical addresses that support storing the received data (e.g., that are free to store data). The memory device may also associate the physical addresses with the logical addresses so that when a host system attempts to access a logical address the data stored by the host at the logical address is retrieved from the corresponding physical address. That is, the memory device may update an L2P table.

At block 305-3, the high-level and/or low-level validity tables may be updated to indicate whether groups of physical addresses store valid data. For example, the memory device may update the high-level and/or low-level validity tables to indicate whether groups of physical addresses store valid data. If the memory device receives an amount of data that exceeds the threshold and is to be written to sequential logical addresses, the memory device may update one or more bits in the high-level table to indicate that each physical address in one or more groups of physical addresses written by the program operation store valid data (e.g., by setting the one or more bits to the logic value 1). In some examples, the memory device may also update the low-level validity table based on setting the bits in the high-level table. For example, the memory device may set (or retain) each of the bits in the low-level table that correspond to the physical addresses of the one or more groups of physical addresses to indicate that the physical addresses store invalid data (e.g., by setting the bits to the logic value 0)—where this indication may be overridden by the high-level indication. As described herein, in some examples, NAND memory cells may be set to the logic value 0 quicker than to the logic value 1. Thus, setting some or all of the relevant bits of the low-level validity table to logic value 0 and relying on the relevant bit of the high-level validity table, rather than representing the true validity state of the physical addresses, may reduce a latency associated with maintaining validity information relative to if a single validity table were used.

In some examples, as part of the write operation, the memory device may update a bit in the high-level table to indicate that a last group of the one or more groups of physical addresses includes one or more physical addresses storing invalid data—e.g., if a portion of the group of physical addresses are programmed as a part of the write operation. In such cases, the memory device may also update the bits in the low-level table that correspond to the programmed physical addresses of the last group of physical addresses to indicate that these physical addresses store valid data. The memory device may also update the bits in the low-level table that correspond to the unprogrammed physical addresses of the last group of physical addresses to indicate that these physical addresses store invalid data or remain free to store data.

Alternatively, if the memory device receives an amount of data that is below the threshold, the memory device may update a bit in the high-level table to indicate that a group of physical addresses used to store the data includes one or more physical addresses that store invalid data. In such cases, the memory device may also update the bits in the low-level table that correspond to the programmed physical addresses to indicate that these physical addresses store valid data. The memory device may also update the bits in the low-level table that correspond to the unprogrammed physical addresses to indicate that these physical addresses store invalid data or remain free to store data.

At block 310, an unmap operation may be performed. For example, a memory device may perform an unmap operation. As part of an unmap operation, the memory device may disassociate a set of logical addresses targeted by the unmap operation with a corresponding set of physical addresses in an L2P table. Also, memory device may not modify the data stored in the corresponding set of physical addresses during the unmap operation.

In some examples, the unmap operation is used to unmap a large amount of data (e.g., greater than 128 Kilobytes of data). In some examples, a large unmap operation may refer to an unmap operation that unmaps an amount of data to a memory array that exceeds an amount of data that can be stored by a group of physical addresses (e.g., by two or more pages). In other examples, the unmap operation is used to unmap a small amount of data (e.g., less than 128 Kilobytes of data). In some examples, a small unmap operation may refer to an unmap operation that unmaps an amount of data to a memory array that is less than an amount of data that can be stored by a group of physical addresses.

At block 310-1, a size of the data to be unmapped may be determined. For example, the memory device may determine a size of the data to be unmapped. In some examples, the memory device may determine that the size of the data exceeds a threshold. In other examples, the memory device may determine that the size of the data is below a threshold.

At block 310-2, one or more commands from a host system to unmap an amount of data having a size that exceeds the threshold may be received. For example, the memory device may receive one or more commands from a host system to unmap an amount of data having a size that exceeds the threshold. Alternatively, the memory device may receive one or more commands from a host system to unmap an amount of data having a size that is below the threshold. In both cases, the memory device may unmap the indicated logical addresses. In some examples, the host system may request that data be unmapped in consecutive logical addresses (that is, the host system may perform a sequential unmapping), and the memory device may unmap a set of consecutive logical addresses.

At block 310-3, the high-level and/or low-level validity tables may be updated to indicate whether groups of physical addresses store valid data. For example, the memory device may update the high-level and/or low-level validity tables to indicate whether groups of physical addresses store valid data. If the memory device unmaps an amount of data that exceeds the threshold and that was previously mapped to a set of sequential logical addresses, the memory device may update one or more bits in the high-level table to indicate that one or more groups of physical addresses unmapped by the unmap operation store invalid data. In some examples (e.g., if a portion of physical addresses in a group of physical addresses are unmapped), the memory device may also update the bits in the low-level table that correspond to the unmapped physical addresses of the partially unmapped physical address group to indicate that these physical addresses store invalid data. The memory device may also update the bits in the low-level table that correspond to the mapped physical addresses of the partially unmapped physical address group to indicate that these physical addresses store valid data.

Alternatively, if the memory device unmaps an amount of data that is below the threshold, the memory device may update a bit in the high-level table to indicate that a group of physical addresses that is partially unmapped by the unmap operation includes one or more physical addresses storing invalid data. In such cases, the memory device may also update the bits in the low-level table that correspond to the mapped physical addresses to indicate that these physical addresses store valid data. The memory device may also update the bits in the low-level table that correspond to the unmapped physical addresses to indicate that these physical addresses store invalid data.

In some examples, the unmap operation is performed on the same physical addresses as the program operation performed at block 305. In some examples (e.g., if the prior program operation was a large program operation), prior to the unmap operation, one or more bits of the high-level validity table associated with the physical address groups may indicate that each physical address in one or more of the physical address groups stores valid data (e.g., each of the one or more bits may be set to the logic value 1). Also, each bit in the low-level validity table that corresponds to the physical address of the physical address groups may indicate that a corresponding physical address stores invalid data (e.g., each of the one or more bits may be set to the logic value 0). In such cases, when the unmap operation unmaps one of the physical address groups, the memory device may simply set the value of the corresponding bit in the high-level validity table to indicate that the physical address group stores invalid data, without updating the bits in the low-level table (which already indicate the physical addresses are invalid). Thus, a latency associated with updating the validity tables may be reduced relative to if a single validity table were used.

At block 315, a rewrite operation may be performed. For example, a memory device may perform a rewrite operation. As part of a rewrite operation, the memory device may transfer the data stored at a set of physical addresses corresponding (e.g., in an L2P table) to a set of logical addresses that are targeted by the rewrite operation to a different set of physical addresses. The memory device may also update the L2P table to reflect the new association between the set of logical addresses and the different set of physical addresses. Also, the memory device may not modify the data stored in the original set of physical addresses during the rewrite operation.

In some examples, the rewrite operation is used to rewrite a large amount of data (e.g., greater than 128 Kilobytes of data). In some examples, a large rewrite operation may refer to a rewrite operation that rewrites an amount of data to a memory array that exceeds an amount of data that can be stored by a group of physical addresses (e.g., by two or more pages). In other examples, the rewrite operation is used to rewrite a small amount of data (e.g., less than 128 Kilobytes of data). In some examples, a small rewrite operation may refer to a rewrite operation that rewrites an amount of data to a memory array that is less than an amount of data that can be stored by a group of physical addresses.

At block 315-1, a size of the data to be rewritten may be determined. For example, the memory device may determine a size of the data to be rewritten. In some examples, the memory device may determine that the size of the data exceeds a threshold. In other examples, the memory device may determine that the size of the data is below a threshold.

At block 315-2, one or more commands may be received from a host system to rewrite an amount of data having a size that exceeds the threshold. For example, the memory device may receive one or more commands from a host system to rewrite an amount of data having a size that exceeds the threshold. Alternatively, the memory device may receive one or more commands from a host system to rewrite an amount of data having a size that is below the threshold. In both cases, the memory device may rewrite the indicated logical addresses. In some examples, the host system may request that data be rewritten in consecutive logical addresses (that is, the host system may perform a sequential rewrite), and the memory device may rewrite a set of consecutive logical addresses.

At block 315-3, the high-level and/or low-level validity tables may be updated to indicate whether groups of physical addresses store valid data. For example, the memory device may update the high-level and/or low-level validity tables to indicate whether groups of physical addresses store valid data. If the memory device rewrites an amount of data that exceeds the threshold and is mapped to a set of sequential logical addresses, the memory device may update one or more bits in the high-level table to indicate that each physical address in one or more groups of physical addresses written by the program operation store valid data (e.g., by setting the one or more bits to the logic value 1). In some examples, the memory device may also update the low-level validity table based on setting the bits in the high-level table. For example, the memory device may set (or retain) each of the bits in the low-level table that correspond to the physical addresses of the one or more groups of physical addresses to indicate that the physical addresses store invalid data (e.g., by setting the bits to the logic value 0)—where this indication may be overridden by the high-level indication. As described herein, in some examples, NAND memory cells may be set to the logic value 0 quicker than to the logic value 1. Thus, setting some or all of the relevant bits of the low-level validity table to logic value 0 and relying on the relevant bit of the high-level validity table, rather than representing the true validity state of the physical addresses, may reduce a latency associated with maintaining validity information relative to if a single validity table were used.

In some examples, as part of the rewrite operation, the memory device may update a bit in the high-level table to indicate that a last group of the one or more groups of physical addresses includes one or more physical addresses storing invalid data—e.g., if a portion of the group of physical addresses are programmed as a part of the rewrite operation. In such cases, the memory device may also update the bits in the low-level table that correspond to the programmed physical addresses of the last group of physical addresses to indicate that these physical addresses store valid data. The memory device may also update the bits in the low-level table that correspond to the unprogrammed physical addresses of the last group of physical addresses to indicate that these physical addresses store invalid data or remain free to store data.

Alternatively, if the memory device receives an amount of data that is below the threshold, the memory device may update a bit in the high-level table to indicate that a group of physical addresses used to store the data includes one or more physical addresses that store invalid data. In such cases, the memory device may also update the bits in the low-level table that correspond to the programmed physical addresses to indicate that these physical addresses store valid data. The memory device may also update the bits in the low-level table that correspond to the unprogrammed physical addresses to indicate that these physical addresses store invalid data or remain free to store data.

In some examples, the rewrite operation is performed on the same physical addresses as the program operation performed at block 305. In some examples (e.g., if the prior program operation was a large program operation), prior to the rewrite operation, one or more bits of the high-level validity table associated with the physical address groups may indicate that each physical address in one or more of the physical address groups stores valid data (e.g., each of the one or more bits may be set to the logic value 1). Also, each bit in the low-level validity table that corresponds to the physical address of the physical address groups may indicate that a corresponding physical address stores invalid data (e.g., each of the one or more bits may be set to the logic value 0). In such cases, when the rewrite operation rewrites one of the physical address groups, the memory device may simply set the value of the corresponding bit in the high-level validity table to indicate that the physical address group stores invalid data, without updating the bits in the low-level table (which already indicate the physical addresses are invalid). Thus, a latency associated with updating the validity tables may be reduced relative to if a single validity table were used.

At block 320, a garbage collection operation may be performed. For example, a memory device may perform garbage collection operation to free up memory resources (that is, to make the memory resources available for storage). As part of the garbage collection operation, the memory device may unmap, rewrite, and erase data stored in a block.

At block 320-1, during an initial phase of the garbage collection operation, the high-level validity table, and, in some examples, the low-level validity table may be checked to determine a pattern of invalid and valid data stored in one or more blocks. For example, during an initial phase of the garbage collection operation, the memory device may check the high-level validity table and, in some examples, the low-level validity table to determine a pattern of invalid and valid data stored in one or more blocks. In some examples, the memory device checks the high-level validity table and transfers data accordingly before checking the low-level validity table. In some examples, the memory device checks the low-level validity table for physical address groups that correspond to a bit in the high-level validity table that indicates invalid data is stored at a physical address group. By consulting the high-level validity table first and a portion of the low-level validity table, the memory device may execute the initial phase of the garbage collection more quickly than if the memory device were to check each entry of the low-level validity table.

At block 320-2, data may be transferred from one block to another based on the validity tables. For example, during a subsequent phase of the garbage collection operation, the memory device may transfer data from one block to another block based on the validity tables. In some examples, the memory device may transfer the data stored at a group of physical addresses to another group of physical addresses based on determining that a corresponding bit of the high-level validity table indicates that the group of physical addresses stores valid data for sequential logical addresses. In some examples, the memory device may transfer the data stored in a portion of a group of physical addresses to another group of physical addresses based on determining that a corresponding bit of the high-level validity table indicates that the group of physical addresses stores invalid data. The memory device may identify the portion of the physical addresses based on multiple bits in a low-level table that indicate, for each physical address, whether the physical address stores valid or invalid data. The memory device may transfer the data from physical addresses identified as storing valid data to the other group of physical addresses. The memory device may repeat the above operations for the entire block. After processing the block, the memory device may erase the data in the block, which may include programming each memory cell in the block to store a logic value 1.

By using the high-level table to facilitate data transfer, the memory device may transfer data included in groups of physical addresses without checking, on an individual basis, whether each of the physical addresses contains valid data, reducing a latency of the garbage collection operation. Also, by maintaining the low-level table, the memory device may identify individual physical addresses in a group of physical addresses that contain valid and invalid data and transfer the data from the physical addresses identified as containing valid data.

At block 320-3, the high-level and/or low-level validity tables may be updated to indicate whether groups of physical address in the new block store valid data. For example, the memory device may update the high-level and/or low-level validity tables to indicate whether groups of physical addresses in the new block store valid data. When the memory device transfers data from a group of physical addresses identified as storing valid data using the high-level table to a new group of physical addresses in a new block, the memory device may set a bit in the high-level table that corresponds to the new group of physical addresses to indicate that each physical address in the new group of physical addresses stores valid data for sequential logical addresses. The memory device may also disassociate the old group of physical addresses from the logical addresses associated with the transferred data and associate the new group of physical addresses with the logical addresses in the L2P table.

When the memory device transfers data from a portion of a group of physical addresses (the group of physical addresses identified as storing invalid data using the high-level table) to a new group of physical addresses in a new block, the memory device may set a bit in the high-level table that corresponds to the new group of physical addresses to indicate that the one or more physical addresses in the new group of physical addresses store invalid data. Also, the memory device may set one or more bits in the low-level table that correspond to the programmed physical addresses in the new group of physical addresses to indicate that the programmed physical addresses store valid data. And the memory device may set one or more bits in the low-level table that correspond to the not programmed physical addresses in the new group of physical addresses to indicate that the not programmed physical addresses store invalid data (or are free to store data). The memory device may also disassociate the old group of physical addresses from the logical addresses associated with the transferred data and associate the new group of physical addresses with the logical addresses in the L2P table.

In some examples, the memory device may similarly transfer data from a portion of another group of physical addresses to the new group of physical addresses in the new block. In some examples, all of the physical addresses in the new group of physical addresses may be programmed based on transferring the data from both portions of the groups of physical addresses. In such cases, the memory device may set a bit in the high-level table that corresponds to the new group of physical addresses to indicate that each physical addresses in the new group of physical addresses stores valid data—e.g., when the group of physical addresses store data for sequential logical addresses. Also, after erasing the old block of memory, the memory device may reset the high-level and low-level validity tables to indicate that the corresponding physical addresses for the old block of memory are free to store data.

Figure 4:
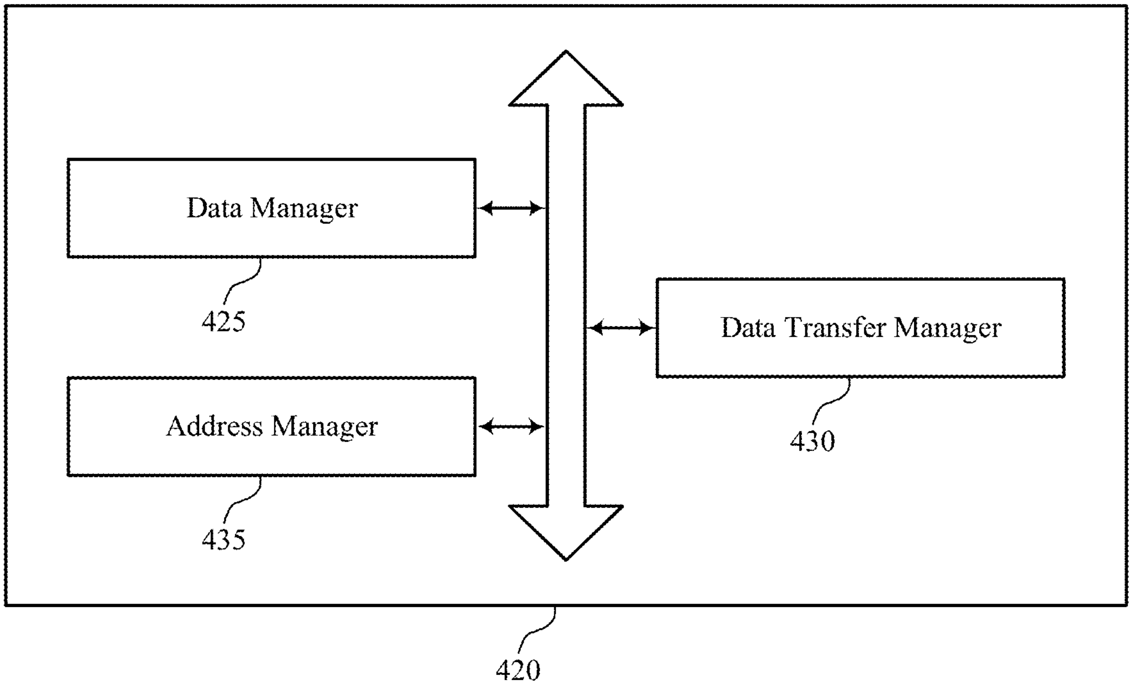
FIG. 4 shows a block diagram of a memory device that supports techniques for accessing managed NAND in accordance with examples as disclosed herein.
Figure 4:

FIG. 4 shows a block diagram 400 of a memory device 420 that supports techniques for accessing managed NAND in accordance with examples as disclosed herein. The memory device 420 may be an example of aspects of a memory device as described with reference to FIGS. 1 through 3. The memory device 420, or various components thereof, may be an example of means for performing various aspects of techniques for accessing managed NAND as described herein. For example, the memory device 420 may include a data manager 425, a data transfer manager 430, an address manager 435, or any combination thereof. Each of these components may communicate, directly or indirectly, with one another (e.g., via one or more buses).

The data manager 425 may be configured as or otherwise support a means for accessing, as part of a memory management operation, a first indicator of a first type that indicates whether each physical address of a first set of physical addresses of the memory device stores valid data, where a plurality of indicators of a second type indicates whether each physical address of the first set of physical addresses stores valid data. The data transfer manager 430 may be configured as or otherwise support a means for transferring, as part of the memory management operation and based at least in part on accessing the first indicator of the first type, data stored at the first set of physical addresses to a second set of physical addresses of the memory device. The address manager 435 may be configured as or otherwise support a means for updating, based at least in part on the memory management operation, a second indicator of the first type that indicates whether each physical address of the second set of physical addresses stores valid data based at least in part on transferring the data.

In some examples, the data manager 425 may be configured as or otherwise support a means for determining that the first indicator of the first type indicates that each physical address of the first set of physical addresses is storing valid data based at least in part on accessing the first indicator, where transferring the data stored by the first set of physical addresses to the second set of physical addresses and updating the second indicator is based at least in part on the determining.

In some examples, the address manager 435 may be configured as or otherwise support a means for updating a second plurality of indicators of the second type so that each indicator of the second plurality of indicators indicates that respective physical addresses of the second set of physical addresses are storing invalid data, the second indicator of the first type overriding the second plurality of indicators of the second type.

In some examples, the data manager 425 may be configured as or otherwise support a means for determining that the first indicator of the first type indicates that that one or more physical addresses of the first set of physical addresses are storing invalid data based at least in part on accessing the first indicator. In some examples, the data manager 425 may be configured as or otherwise support a means for accessing the plurality of indicators of the second type based at least in part on determining that one or more memory cells sets of the first set of physical addresses are storing invalid data. In some examples, the data manager 425 may be configured as or otherwise support a means for identifying a subset of the first set of physical addresses that store valid data based at least in part on the plurality of indicators of the second type, where transferring the data further comprises transferring data stored by the subset of the first set of physical addresses to the second set of physical addresses based at least in part on the identifying.

In some examples, the address manager 435 may be configured as or otherwise support a means for updating a second plurality of indicators of the second type to indicate that a subset of the second set of physical addresses are storing valid data.

In some examples, the data transfer manager 430 may be configured as or otherwise support a means for transferring, as part of the memory management operation, data stored by a subset of a third set of physical addresses to the second set of physical addresses. In some examples, the address manager 435 may be configured as or otherwise support a means for updating the second indicator of the first type to indicate that each physical address of the second set of physical addresses stores valid data based at least in part on transferring the subset of the third set of physical addresses to the second set of physical addresses. In some examples, the address manager 435 may be configured as or otherwise support a means for updating a second plurality of indicators of the second type so that each indicator of the second plurality of indicators indicates that respective physical addresses of the second set of physical addresses are storing invalid data, the second indicator of the first type overriding the second plurality of indicators of the second type.

In some examples, the data manager 425 may be configured as or otherwise support a means for writing, after the memory management operation is complete, second data to a third set of physical addresses. In some examples, the address manager 435 may be configured as or otherwise support a means for updating, based at least in part on the writing, a third indicator of the first type to indicate that each physical address of the third set of physical addresses are storing valid data.

In some examples, the address manager 435 may be configured as or otherwise support a means for updating a third plurality of indicators of the second type so that each indicator of the third plurality of indicators indicates that respective physical addresses of the third set of physical addresses are storing invalid data, the third indicator of the first type overriding the third plurality of indicators of the second type.

In some examples, the data manager 425 may be configured as or otherwise support a means for unmapping data associated with a third set of physical addresses, wherein a third indicator of the first type indicates that each physical address of the third set of physical addresses is storing valid data and each indicator of a third plurality of indicators of the second type indicates that each physical address of the third set of physical addresses is storing invalid data, the third indicator of the first type overriding the third plurality of indicators of the second type. In some examples, the address manager 435 may be configured as or otherwise support a means for updating, based at least in part on unmapping the data, the third indicator of the first type to indicate that one or more physical addresses of the third set of physical addresses are storing invalid data.

In some examples, the data manager 425 may be configured as or otherwise support a means for unmapping data associated with a third set of physical addresses, where a third indicator of the first type indicates that each physical address of the third set of physical addresses is storing valid data and each indicator of a third plurality of indicators of the second type indicates that each physical address of the third set of physical addresses is storing invalid data, the third indicator of the first type overriding the third plurality of indicators of the second type. In some examples, the address manager 435 may be configured as or otherwise support a means for updating, based at least in part on unmapping the data, the third indicator of the first type to indicate that one or more physical addresses of the third set of physical addresses are storing invalid data. In some examples, the address manager 435 may be configured as or otherwise support a means for updating, based at least in part on unmapping the data, the third plurality of indicators of the second type to indicate which physical addresses of the third set of physical addresses are storing valid data.

In some examples, the data manager 425 may be configured as or otherwise support a means for rewriting data associated with a third set of physical addresses, where a third indicator of the first type indicates that each physical address of the third set of physical addresses is storing valid data and each indicator of a third plurality of indicators of the second type indicates that each physical address of the third set of physical addresses is storing invalid data, the third indicator of the first type overriding the third plurality of indicators of the second type. In some examples, the address manager 435 may be configured as or otherwise support a means for updating, based at least in part on the rewriting, the third indicator of the first type to indicate that one or more physical addresses of the third set of physical addresses are storing invalid data. In some examples, the address manager 435 may be configured as or otherwise support a means for updating, based at least in part on the rewriting, the third plurality of indicators of the second type to indicate which physical addresses of the third set of physical addresses are storing valid data.

In some examples, the first indicator of the first type indicates that each physical address of the first set of physical addresses is storing valid data, and each indicator of the plurality of indicators of the second type indicate that the respective physical addresses of the first set of physical addresses are storing invalid data, the first indicator of the first type overriding the plurality of indicators of the second type.

In some examples, to support transferring the data, the data transfer manager 430 may be configured as or otherwise support a means for transferring a portion of the data stored by the first set of physical addresses to the second set of physical addresses.

In some examples, a first block comprises the first set of physical addresses and a second block comprises the second set of physical addresses.

Figure 5:
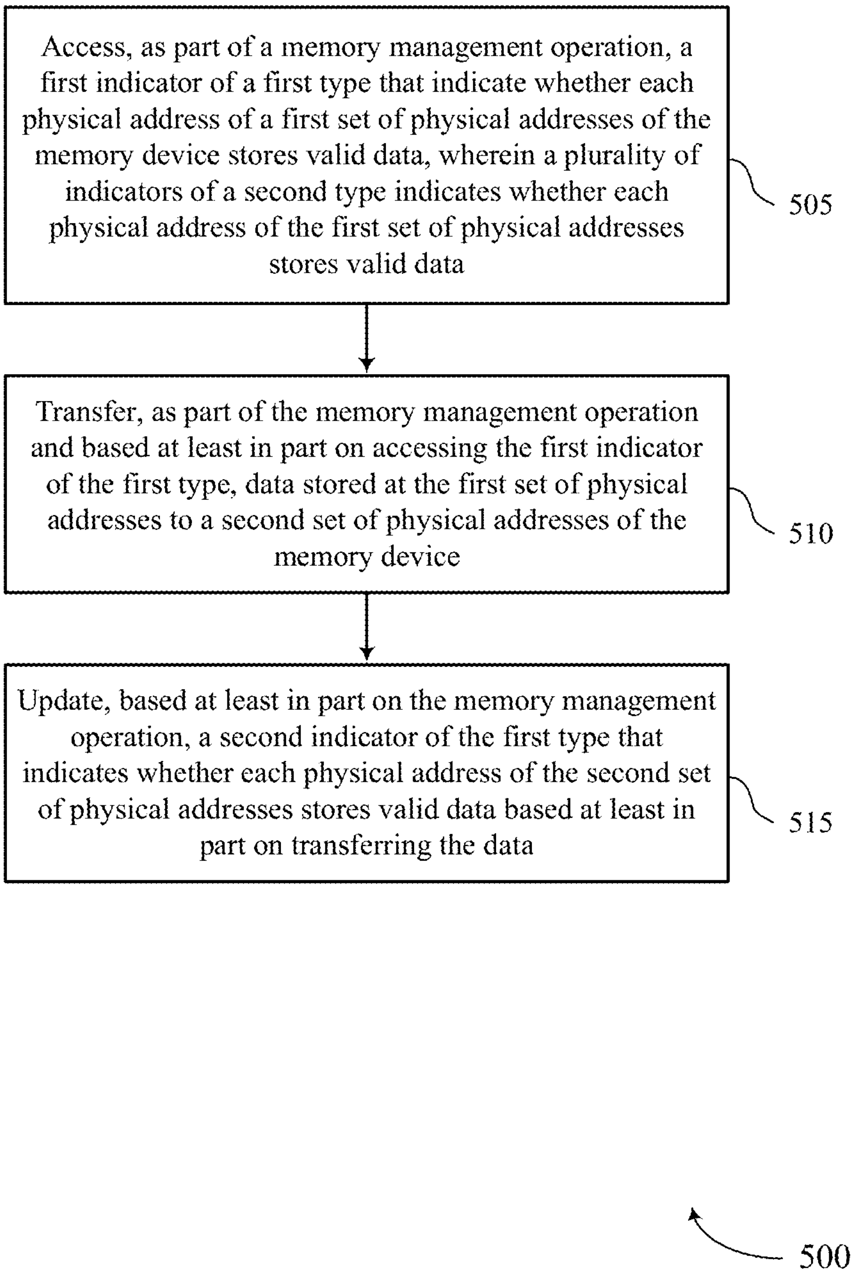
FIG. 5 shows a flowchart illustrating a method or methods that support techniques for accessing managed NAND in accordance with examples as disclosed herein.

In some examples, the first indicator of the first type indicates whether each physical address of the first set of physical addresses of the memory array stores valid data for a set of sequential logical addresses FIG. 5 shows a flowchart illustrating a method 500 that supports techniques for accessing managed NAND in accordance with examples as disclosed herein. The operations of method 500 may be implemented by a memory device or its components as described herein. For example, the operations of method 500 may be performed by a memory device as described with reference to FIGS. 1 through 4. In some examples, a memory device may execute a set of instructions to control the functional elements of the device to perform the described functions. Additionally, or alternatively, the memory device may perform aspects of the described functions using special-purpose hardware.

At 505, the method may include accessing, as part of a memory management operation, a first indicator of a first type that indicates whether each physical address of a first set of physical addresses of the memory device stores valid data, where a plurality of indicators of a second type indicates whether each physical address of the first set of physical addresses stores valid data. The operations of 505 may be performed according to the methods described herein. In some examples, aspects of the operations of 505 may be performed by a data manager 425 as described with reference to FIG. 4.

At 510, the method may include transferring, as part of the memory management operation and based at least in part on accessing the first indicator of the first type, data stored at the first set of physical addresses to a second set of physical addresses of the memory device. The operations of 510 may be performed according to the methods described herein. In some examples, aspects of the operations of 510 may be performed by a data transfer manager 430 as described with reference to FIG. 4.

At 515, the method may include updating, based at least in part on the memory management operation, a second indicator of the first type that indicates whether each physical address of the second set of physical addresses stores valid data based at least in part on transferring the data. The operations of 515 may be performed according to the methods described herein. In some examples, aspects of the operations of 515 may be performed by an address manager 435 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for accessing, as part of a memory management operation, a first indicator of a first type that indicates whether each physical address of a first set of physical addresses of the memory device stores valid data, where a plurality of indicators of a second type indicates whether each physical address of the first set of physical addresses stores valid data, transferring, as part of the memory management operation and based at least in part on accessing the first indicator of the first type, data stored at the first set of physical addresses to a second set of physical addresses of the memory device, and updating, based at least in part on the memory management operation, a second indicator of the first type that indicates whether each physical address of the second set of physical addresses stores valid data based at least in part on transferring the data.

Some examples of the method 500 and the apparatus described herein may further include operations, features, circuitry, logic, means, or instructions for determining that the first indicator of the first type indicates that each physical address of the first set of physical addresses may be storing valid data based at least in part on accessing the first indicator, where transferring the data stored by the first set of physical addresses to the second set of physical addresses and updating the second indicator may be based at least in part on the determining.

Some examples of the method 500 and the apparatus described herein may further include operations, features, circuitry, logic, means, or instructions for updating a second plurality of indicators of the second type so that each indicator of the second plurality of indicators indicates that respective physical addresses of the second set of physical addresses may be storing invalid data, the second indicator of the first type overriding the second plurality of indicators of the second type.

Some examples of the method 500 and the apparatus described herein may further include operations, features, circuitry, logic, means, or instructions for determining that the first indicator of the first type indicates that that one or more physical addresses of the first set of physical addresses may be storing invalid data based at least in part on accessing the first indicator, accessing the plurality of indicators of the second type based at least in part on determining that one or more memory cells sets of the first set of physical addresses may be storing invalid data, and identifying a subset of the first set of physical addresses that store valid data based at least in part on the plurality of indicators of the second type, where transferring the data further comprises transferring data stored by the subset of the first set of physical addresses to the second set of physical addresses based at least in part on the identifying.

Some examples of the method 500 and the apparatus described herein may further include operations, features, circuitry, logic, means, or instructions for updating a second plurality of indicators of the second type to indicate that a subset of the second set of physical addresses may be storing valid data.

Some examples of the method 500 and the apparatus described herein may further include operations, features, circuitry, logic, means, or instructions for transferring, as part of the memory management operation, data stored by a subset of a third set of physical addresses to the second set of physical addresses, updating the second indicator of the first type to indicate that each physical address of the second set of physical addresses stores valid data based at least in part on transferring the subset of the third set of physical addresses to the second set of physical addresses, and updating a second plurality of indicators of the second type so that each indicator of the second plurality of indicators indicates that respective physical addresses of the second set of physical addresses may be storing invalid data, the second indicator of the first type overriding the second plurality of indicators of the second type.

In some examples of the method 500 and the apparatus described herein, writing, after the memory management operation may be complete, second data to a third set of physical addresses and updating, based at least in part on the writing, a third indicator of the first type to indicate that each physical address of the third set of physical addresses may be storing valid data.

Some examples of the method 500 and the apparatus described herein may further include operations, features, circuitry, logic, means, or instructions for updating a third plurality of indicators of the second type so that each indicator of the third plurality of indicators indicates that respective physical addresses of the third set of physical addresses may be storing invalid data, the third indicator of the first type overriding the third plurality of indicators of the second type.

Some examples of the method 500 and the apparatus described herein may further include operations, features, circuitry, logic, means, or instructions for unmapping data associated with a third set of physical addresses, where a third indicator of the first type indicates that each physical address of the third set of physical addresses may be storing valid data and each indicator of a third plurality of indicators of the second type indicates that each physical address of the third set of physical addresses may be storing invalid data, the third indicator of the first type overriding the third plurality of indicators of the second type and updating, based at least in part on unmapping the data, the third indicator of the first type to indicate that one or more physical addresses of the third set of physical addresses may be storing invalid data.

Some examples of the method 500 and the apparatus described herein may further include operations, features, circuitry, logic, means, or instructions for unmapping data associated with a third set of physical addresses, where a third indicator of the first type indicates that each physical address of the third set of physical addresses may be storing valid data and each indicator of a third plurality of indicators of the second type indicates that each physical address of the third set of physical addresses may be storing invalid data, the third indicator of the first type overriding the third plurality of indicators of the second type, updating, based at least in part on unmapping the data, the third indicator of the first type to indicate that one or more physical addresses of the third set of physical addresses may be storing invalid data, and updating, based at least in part on unmapping the data, the third plurality of indicators of the second type to indicate which physical addresses of the third set of physical addresses may be storing valid data.

Some examples of the method 500 and the apparatus described herein may further include operations, features, circuitry, logic, means, or instructions for rewriting data associated with a third set of physical addresses, where a third indicator of the first type indicates that each physical address of the third set of physical addresses may be storing valid data and each indicator of a third plurality of indicators of the second type indicates that each physical address of the third set of physical addresses may be storing invalid data, the third indicator of the first type overriding the third plurality of indicators of the second type, updating, based at least in part on the rewriting, the third indicator of the first type to indicate that one or more physical addresses of the third set of physical addresses may be storing invalid data, and updating, based at least in part on the rewriting, the third plurality of indicators of the second type to indicate which physical addresses of the third set of physical addresses may be storing valid data.

In some examples of the method 500 and the apparatus described herein, the first indicator of the first type indicates that each physical address of the first set of physical addresses may be storing valid data, and each indicator of the plurality of indicators of the second type indicate that the respective physical addresses of the first set of physical addresses may be storing invalid data, the first indicator of the first type overriding the plurality of indicators of the second type.

In some examples of the method 500, to transfer the data, the apparatus described herein may further include operations, features, circuitry, logic, means, or instructions for transferring a portion of the data stored by the first set of physical addresses to the second set of physical addresses.

In some examples of the method 500 and the apparatus described herein, a first block comprises the first set of physical addresses and a second block comprises the second set of physical addresses.

In some examples of the method 500 and the apparatus described herein, the first indicator of the first type indicates whether each physical address of the first set of physical addresses of the memory array stores valid data for a set of sequential logical addresses.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms “electronic communication,” “conductive contact,” “connected,” and “coupled” may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term “coupling” refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term “isolated” refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be “on” or “activated” when a voltage greater than or equal to the transistor’s threshold voltage is applied to the transistor gate. The transistor may be “off” or “deactivated” when a voltage less than the transistor’s threshold voltage is applied to the transistor gate.

The description set forth herein, in connection with the appended drawings, describes example configurations and does not represent all the examples that may be implemented or that are within the scope of the claims. The term “exemplary” used herein means “serving as an example, instance, or illustration,” and not “preferred” or “advantageous over other examples.” The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory system, comprising:

one or more memory devices; and processing circuitry coupled with the one or more memory devices and configured to cause the memory system to:

access a bit of a first validity table that indicates whether each physical address of a set of physical addresses stores valid data; and determine whether to access a second validity table in response to determining whether the bit in the first validity table indicates that data stored at the set of physical addresses is valid or invalid.

2. The memory system of claim 1, wherein the processing circuitry is further configured to cause the memory system to:

refrain from accessing the second validity table in response to determining that the bit in the first validity table indicates that the data stored at the set of physical addresses is valid.

3. The memory system of claim 2, wherein the processing circuitry is further configured to cause the memory system to:

transfer the data stored at the set of physical addresses to a second set of physical addresses in response to determining that the first validity table indicates valid data for the set of physical addresses and accessing the first validity table; and update the first validity table in response to transferring the data.

4. The memory system of claim 1, wherein the processing circuitry is further configured to cause the memory system to:

access a plurality of bits of the second validity table in response to determining that the bit in the first validity table indicates that the data stored at the set of physical addresses is invalid, wherein each bit of the plurality of bits of the second validity table indicates whether a respective physical address of the set of physical addresses stores valid data.

5. The memory system of claim 4, wherein the processing circuitry is further configured to cause the memory system to:

determine whether to transfer data for each bit of the plurality of bits based at least in part on a value of each bit of the plurality of bits; and transfer data stored at a subset of the set of physical addresses to a second set of physical addresses in response to determining that each bit of the subset of the plurality of bits indicates that the respective physical address stores valid data.

6. The memory system of claim 1, wherein a first block comprises the set of physical addresses.

7. The memory system of claim 6, wherein the set of physical addresses is associated with one or more pages of the first block.

8. The memory system of claim 1, wherein a first bit of the first validity table indicates whether each physical address of the set of physical addresses stores valid data for a set of sequential logical addresses.

9. A memory system, comprising:

one or more memory devices; and processing circuitry coupled with the one or more memory devices and configured to cause the memory system to:

receive a program command indicating data to be programmed during a program operation;

program, during the program operation, the data to one or more memory cells in accordance with the program command, the programming comprising storing the data at one or more groups of physical addresses of the one or more memory cells;

update a first validity table to indicate that each group of physical addresses of the one or more groups of physical addresses programmed during the program operation stores valid data; and update a second validity table in accordance with updating the first validity table.

10. The memory system of claim 9, wherein, to update the first validity table, the one or more memory devices are configured to cause the memory system to:

set or retain, for each group of physical addresses of the one or more groups of physical addresses, one or more bits in the first validity table to indicate that each physical address of the group stores valid data, wherein updating the second validity table is in accordance with setting the one or more bits for each group in the first validity table.

11. The memory system of claim 10, wherein, to update the second validity table, the one or more memory devices are configured to cause the memory system to:

set or retain, for each physical address of each group of the one or more groups of physical addresses, one or more bits of the second validity table to indicate that the physical address stores invalid data, the one or more bits for each group in the first validity table overriding the one or more bits for each physical address of the group in the second validity table.

12. The memory system of claim 9, wherein the processing circuitry is further configured to cause the memory system to:

unmap second data associated with one or more second groups of physical addresses;

update, in response to unmapping the second data, the first validity table to indicate that one or more physical addresses of the one or more second groups of physical addresses are storing invalid data; and update, in response to unmapping the second data, the second validity table in accordance with updating the first validity table to indicate which physical addresses of the one or more second groups of physical addresses are storing valid data.

13. The memory system of claim 9, wherein the processing circuitry is further configured to cause the memory system to:

rewrite second data associated with the one or more groups of physical addresses;

update, in response to the rewriting, the first validity table to indicate that one or more physical addresses of the one or more groups of physical addresses are storing invalid data; and update, in response to the rewriting, the second validity table in accordance with updating the first validity table to indicate which physical addresses of the one or more groups of physical addresses are storing valid data.

14. The memory system of claim 9, wherein the processing circuitry is further configured to cause the memory system to:

transfer, as part of a garbage collection operation and in accordance with accessing the first validity table, the second validity table, or both, at least a portion of the data stored at the one or more groups of physical addresses to one or more second groups of physical addresses; and update, in accordance with the garbage collection operation, the first validity table, the second validity table, or both, in response to transferring the data.

15. A non-transitory computer-readable medium storing code comprising instructions which, when executed by processing circuitry of an electronic device, cause the electronic device to:

access a bit of a first validity table that indicates whether each physical address of a set of physical addresses stores valid data; and determine whether to access a second validity table in response to determining whether the bit in the first validity table indicates that data stored at the set of physical addresses is valid or invalid.

16. The non-transitory computer-readable medium of claim 15, wherein the instructions, when executed by the processing circuitry of the electronic device, further cause the electronic device to:

refrain from accessing the second validity table in response to determining that the bit in the first validity table indicates that the data stored at the set of physical addresses is valid.

17. The non-transitory computer-readable medium of claim 16, wherein the instructions, when executed by the processing circuitry of the electronic device, further cause the electronic device to:

transfer the data stored at the set of physical addresses to a second set of physical addresses in response to determining that the first validity table indicates valid data for the set of physical addresses and accessing the first validity table; and update the first validity table in response to transferring the data.

18. The non-transitory computer-readable medium of claim 15, wherein the instructions, when executed by the processing circuitry of the electronic device, further cause the electronic device to:

access a plurality of bits of the second validity table in response to determining that the bit in the first validity table indicates that the data stored at the set of physical addresses is invalid, wherein each bit of the plurality of bits of the second validity table indicates whether a respective physical address of the set of physical addresses stores valid data.

19. The non-transitory computer-readable medium of claim 18, wherein the instructions, when executed by the processing circuitry of the electronic device, further cause the electronic device to:

determine whether to transfer data for each bit of the plurality of bits in response to determining whether each bit of the plurality of bits indicates that the respective physical address stores valid data; and transfer data stored at a subset of the set of physical addresses to a second set of physical addresses in response to determining that each bit of the subset of the plurality of bits indicates that the respective physical address stores valid data.

20. The non-transitory computer-readable medium of claim 15, wherein a first block comprises the set of physical addresses, and wherein the set of physical addresses is associated with one or more pages of the first block.

* * * * *